United States Patent
Zhao et al.

(10) Patent No.: US 12,231,721 B2
(45) Date of Patent: *Feb. 18, 2025

(54) METHOD AND APPARATUS FOR MEDIA SCENE DESCRIPTION

(71) Applicant: TENCENT AMERICA LLC, Palo Alto, CA (US)

(72) Inventors: Shuai Zhao, Pleasanton, CA (US); Stephan Wenger, Hillsborough, CA (US); Iraj Sodagar, Los Angeles, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,305

(22) Filed: Sep. 14, 2023

(65) Prior Publication Data

US 2024/0007708 A1 Jan. 4, 2024

Related U.S. Application Data

(63) Continuation of application No. 17/489,103, filed on Sep. 29, 2021, now Pat. No. 11,800,184.

(51) Int. Cl.
*G06T 15/20* (2011.01)
*H04N 21/218* (2011.01)
(Continued)

(52) U.S. Cl.
CPC ....... *H04N 21/44004* (2013.01); *G06T 15/20* (2013.01); *H04N 21/21805* (2013.01); *H04N 21/816* (2013.01)

(58) Field of Classification Search
CPC ....... H04N 21/44004; H04N 21/21805; H04N 21/816; G06T 15/20
See application file for complete search history.

(56) References Cited

U.S. PATENT DOCUMENTS

2019/0158815 A1 5/2019 He et al.
2020/0389640 A1 12/2020 Lee et al.
(Continued)

FOREIGN PATENT DOCUMENTS

JP 2019-521587 A 7/2019
JP WO2020/116154 A1 6/2020
(Continued)

OTHER PUBLICATIONS

Extended European Search Report dated May 15, 2023 in European Application No. 21918025.4.
Zhao et al., "[SD] On DASH Dynamic Bitrate Adaption with Viewpoint Update", ISO/IEC JTC1/SC29/WG3, m56094, Jan. 2021, (5 pages total).
Thomas et al., "MPEG Media Enablers For Richer XR Experiences", arxiv.org, Cornell University Library, Oct. 2020, (12 pages total).
Office Action dated May 17, 2023 from the Korean Patent Office in Application No. 10-2022-7029499.
(Continued)

*Primary Examiner* — Thai Q Tran
*Assistant Examiner* — Jose M Mesa
(74) *Attorney, Agent, or Firm* — Sughrue Mion, PLLC

(57) ABSTRACT

Systems, methods, and devices for managing media storage and delivery, including obtaining information about a three-dimensional (3D) scene; obtaining, from the information, a parameter indicating that viewport adaptation is enabled; rendering the 3D scene, wherein the 3D scene includes at least one two-dimensional (2D) video to be reproduced within the 3D scene; obtaining a current viewport of a user; determining whether the at least one 2D video is inside of a range of the current viewport; and adjusting a bitrate of the at least one 2D video based on a result of the determining.

20 Claims, 12 Drawing Sheets

(51) Int. Cl.
    *H04N 21/44*         (2011.01)
    *H04N 21/81*         (2011.01)

(56)                 References Cited

U.S. PATENT DOCUMENTS

| | | | |
|---|---|---|---|
| 2021/0006614 A1* | 1/2021 | Oyman | H04L 65/756 |
| 2021/0209829 A1* | 7/2021 | Ilola | H04N 21/8146 |
| 2022/0053224 A1 | 2/2022 | Katsumata et al. | |

FOREIGN PATENT DOCUMENTS

| | | |
|---|---|---|
| KR | 10-2019-0038664 A | 4/2019 |
| KR | 10-2020-0087845 A | 7/2020 |
| WO | 2020/201632 A1 | 10/2020 |

OTHER PUBLICATIONS

Timothy Scully et al., "gITF Streaming from 3D Repo to X3DOM", n Proceedings of the 21st International Conference on Web3D Technology, Jul. 2016, pp. 7-15 (9 pages total).
Sergio Bravo S.A., "Development of a GLTF File Importer for Unreal Engine 4" Sheffield Hallam University, May 2019, pp. 7-15 (64 pages total).
International Search Report dated Jan. 27, 2022 in Application No. PCT/US 21/53088.
Written Opinion of the International Searching Authority dated Jan. 27, 2022 in Application No. PCT/US 21/53088.
Office Action issued Nov. 21, 2023 in Korean Application No. 10-2022-7029499.
Office Action issued Dec. 12, 2023 in Japanese Application No. 2022-557649.

* cited by examiner

FIG. 5

```
{
  "nodes": [                    501
    {
      "name":"nodeName"         502
    }
  ],
  "scenes": [                   503
    {
      "name": "sceneName",      504
      "nodes": [ 0 ]            505
    }
  ],
  "scene": 0                    506
}
```

```
{
"extensionsRequired":[       ─ 601
    "MPEG_media"             ─ 602
],
"extensionsUsed":[           ─ 603
    "MPEG_media"             ─ 604
]
}
```

```
{
  "extensions": {
    "MPEG_media": {
      media: [
        {
          "name": "source 0",
          "renderingRate": 30.0,
          "timeOffset": 0.1,
          "autoplay": "true",           ← 621
          "loop": "true",               ← 622
          "controls": "false",
          "alternatives": [
            {
              "mimeType": "application/dash+xml",    ← 613
              "uri": "manifest-1.mpd",               ← 614
              "tracks": [                            ← 615
                {
                  "track": "#480p_ID=1"
                },
                {
                  "track": "#720p_ID=2"
                },
                {
                  "track": "#1080p_ID=3"
                },
              ]
            }
            {
              "mimeType": "application/dash+xml",
              "uri": "manifest-2.mpd",
              "tracks": [                    ← 616
                {
                  "track": "#4K_ID=1"
                },
                {
                  "track": "#8K_ID=2"
                },
              ]
            }
          ],
        ]
        }
      ]
    }
  }
}
```

FIG. 8

```
{
  "extensionsRequired": [
    "MPEG_dash_viewport_adaptation"
  ],
  "extensionsUsed": [
    "MPEG_dash_viewport_adaptation"
  ]
}
```

801 — "extensionsRequired": [
802 — "MPEG_dash_viewport_adaptation"
803 — "extensionsUsed": [
804 — "MPEG_dash_viewport_adaptation"

```
"cameras":[{
    "name": "Finite perspective camera",
    "type": "perspective",
    ...
    "extensions": {
        "MPEG_dash_viewport_adaptation":[{
            "name": "DASH viewport adaptation",
            "adaptive": true,
        }]
    }
}]
```

FIG. 9

METHOD AND APPARATUS FOR MEDIA SCENE DESCRIPTION

CROSS-REFERENCE TO RELATED APPLICATION

This application is a Continuation application of U.S. application Ser. No. 17/489,103 filed Sep. 29, 2021, which claims priority from U.S. Provisional Application No. 63/134,568, filed on Jan. 6, 2021, the disclosures of which is incorporated herein by reference in its entirety.

FIELD

Embodiments of the present disclosure relate to system design to support media objects using a three-dimensional (3D) modeling syntax, implement media syntax to support various media codecs, containers, and formats, manage media storage and delivery method through predefined programming interfaces, and provide media buffer control and rendering functions.

BACKGROUND

ISO/IEC 23009-1 Dynamic Adaptive Streaming over Hypertext Transfer Protocol (DASH) standard is an adaptive bitrate streaming technique that enables high quality using HTTP as transport level protocol.

The Graphics Language Transmission Format (glTF) is an API-neutral runtime asset 3D modeling delivery format. Compared with traditional 3D modeling tools, glTF provides a more efficient, extensible, interoperable format for the transmission and loading of 3D content. glTF2.0 is the most recent version of the glTF specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

"Information technology—Coding of audiovisual objects—Part 12: ISO base media file format", ISO/IEC 14496-12 (December 2015), "Draft of FDIS of ISO/IEC 23000-19 Common Media Application Format for Segmented Media", ISO/IEC JTC1/SC29/WG11 MPEG117/16819 (April 2017); and "Text of ISO/IEC FDIS 23009-1 4th edition", ISO/IEC JTC 1/SC 29/WG 11 N18609 (August 2019), and the glTF2.0 specification are incorporated herein by reference in their entirety.

SUMMARY

According to an embodiment, a method of managing media storage and delivery includes obtaining information about a three-dimensional (3D) scene; obtaining, from the information, a parameter indicating that viewport adaptation is enabled; rendering the 3D scene, wherein the 3D scene includes at least one two-dimensional (2D) video to be reproduced within the 3D scene; obtaining a current viewport of a user; determining whether the at least one 2D video is inside of a range of the current viewport; and adjusting a bitrate of the at least one 2D video based on a result of the determining.

According to an embodiment, a device for managing media storage and delivery, the device includes at least one memory configured to store program code; and at least one processor configured to read the program code and operate as instructed by the program code, the program code including: first obtaining code configured to cause the at least one processor to obtain information about a three-dimensional (3D) scene; second obtaining code configured to cause the at least one processor to obtain, from the information, a parameter indicating that viewport adaptation is enabled; rendering code configured to cause the at least one processor to render the 3D scene, wherein the 3D scene includes at least one two-dimensional (2D) video to be reproduced within the 3D scene; third obtaining code configured to cause the at least one processor to obtain a current viewport of a user; second determining code configured to cause the at least one processor to determine whether the at least one 2D video is inside of a range of the current viewport; and adjusting code configured to cause the at least one processor to adjust a bitrate of the at least one 2D video based on a result of the determining.

According to an embodiment, a non-transitory computer-readable medium stores instructions, the instructions including: one or more instructions that, when executed by at least one processor of a device for managing media storage and delivery, cause the at least one processor to: obtain information about a three-dimensional (3D) scene; obtain, from the information, a parameter indicating that viewport adaptation is enabled; render the 3D scene, wherein the 3D scene includes at least one two-dimensional (2D) video to be reproduced within the 3D scene; obtain a current viewport of a user; determine whether the at least one 2D video is inside of a range of the current viewport; and adjust a bitrate of the at least one 2D video based on a result of the determining.

BRIEF DESCRIPTION OF THE DRAWINGS

Further features, the nature, and various advantages of the disclosed subject matter will be more apparent from the following detailed description and the accompanying drawings in which:

FIG. 5 is an example of glTF JavaScript Object Notation (JSON) format representation, according to embodiments.

FIG. 6A is an example of MPEG glTF extension, according to embodiments.

FIG. 6B is an example of timed media JSON representation, according to embodiments.

FIG. 8 is a schematic illustration of DASH viewport adaptation top-level syntax, according to embodiments.

FIG. 9 is a schematic illustration of an example of MPEG_dash_viewport_adaptation usage, according to embodiments.

DETAILED DESCRIPTION

Figure 1:
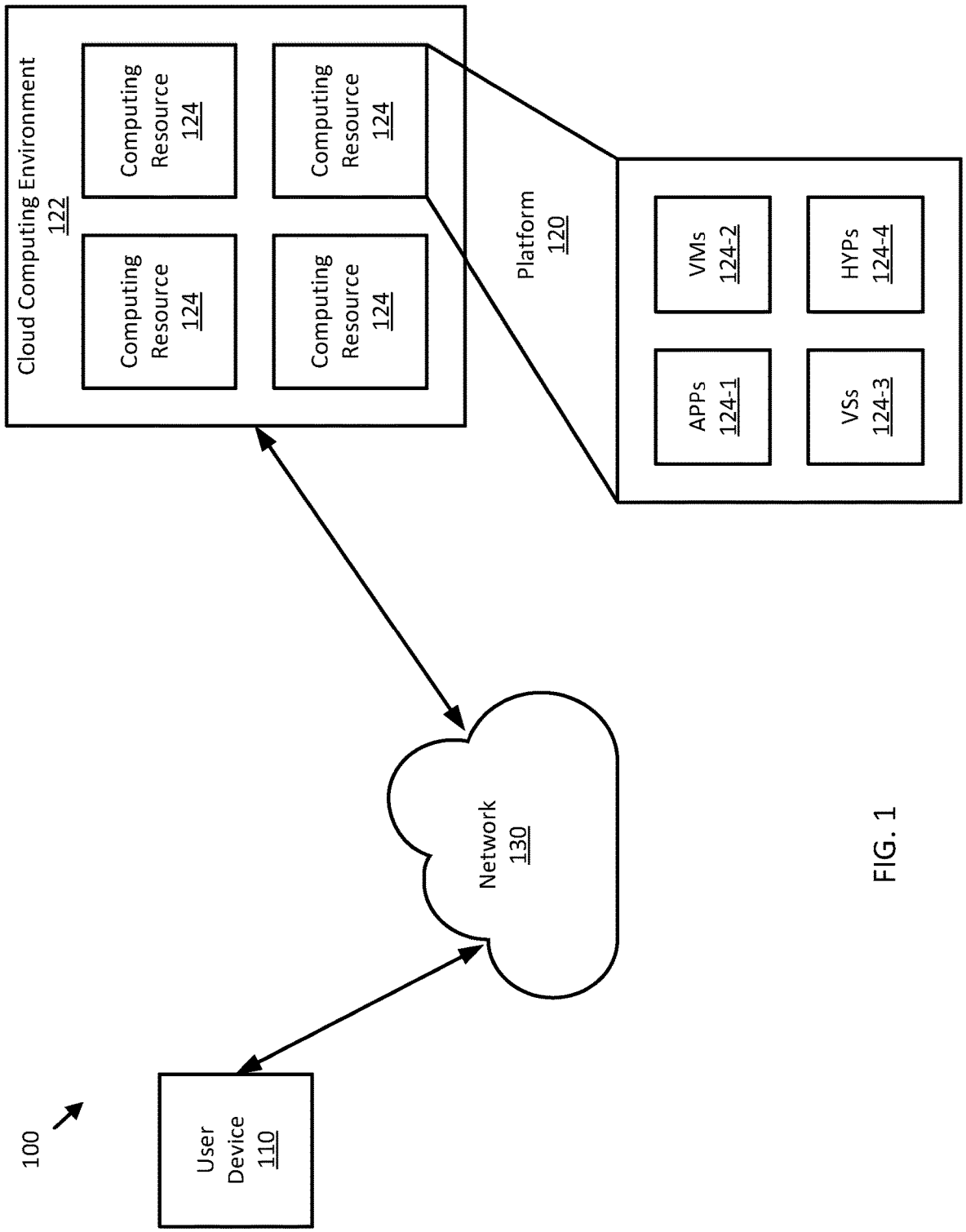
FIG. 1 is a diagram of an environment in which methods, apparatuses and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
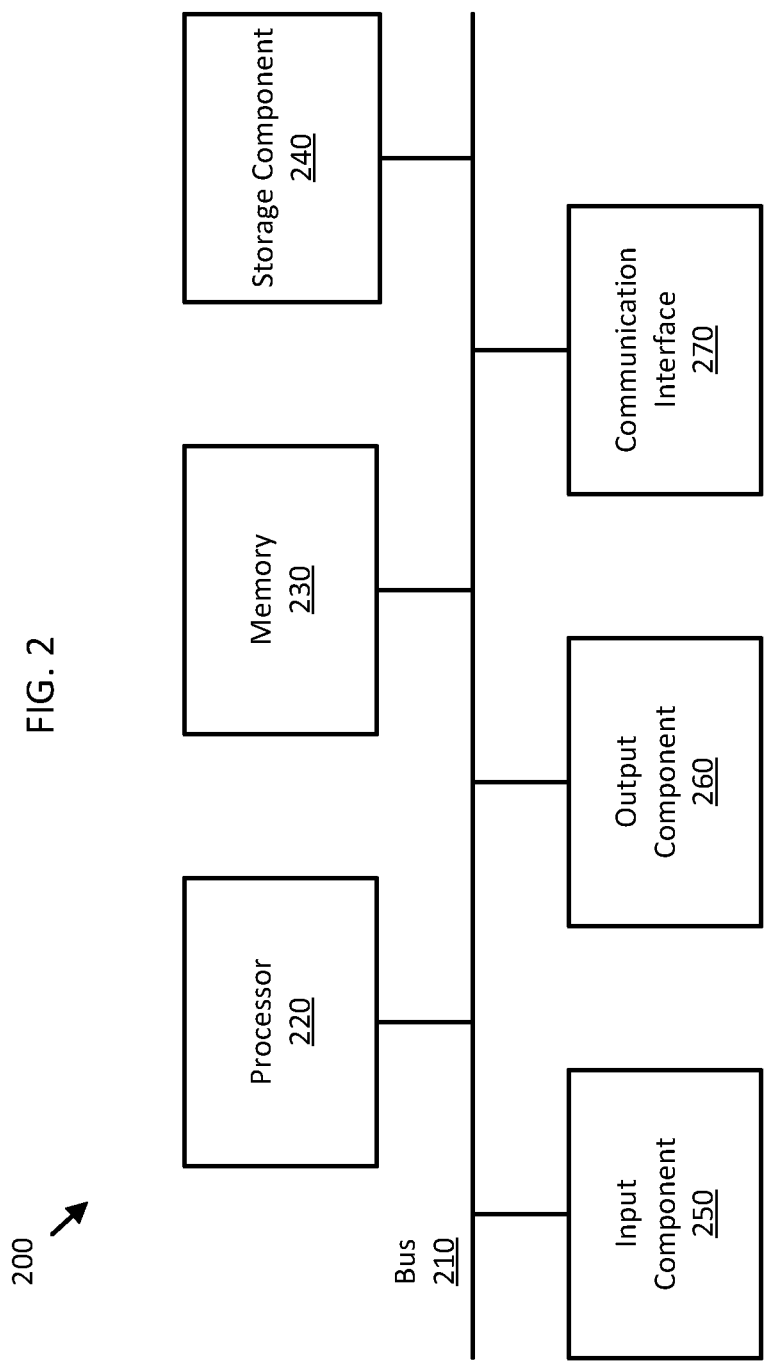
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
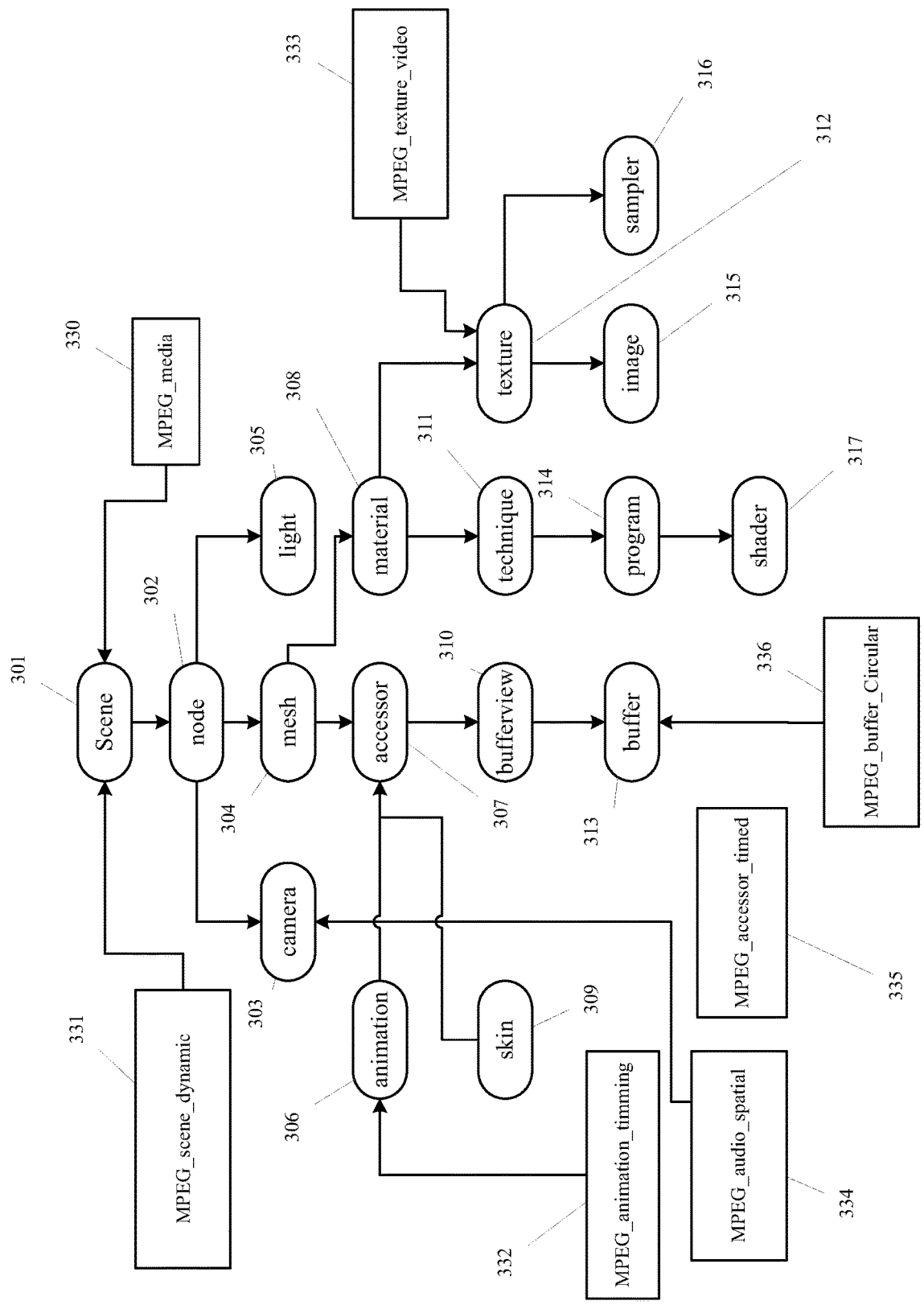
FIG. 3 is a schematic illustration of glTF scene description objects, according to embodiments.

Referring to FIG. 3, the Graphics Language Transmission Format (glTF) is an application programming interface (API)-neutral runtime asset 3D modeling delivery format. Compared with traditional 3D modeling tools, glTF provides a more efficient, extensible, interoperable format for the transmission and loading of 3D content.

A glTF scene may be a combination of multiple glTF assets. The glTF assets may be JavaScript Object Notation (JSON)-formatted files containing a full scene description which may include, for example, a scene object 301, node 302, camera 303, mesh 304, light 305, animation 306, accessor 307, material 308, skin 309, bufferview 310, technique 311, texture 312, buffer 313, program 314, image 315, sampler 316, shader 317, plus supporting external data.

glTF also supports external data sources which may be referenced in any above-mentioned scene objects. In embodiments, a binary file may be used for animation 306 or other buffer-based data 313. An image file may be used for object textures 312.

Referring to FIG. 5, as mentioned above, a glTF scene may be organized in JSON format. A glTF asset may include zero or more scenes 503, which may be the set of visual objects to render. Scenes may be defined in a scene array. In example illustrated in FIG. there is a single scene 506 with a single node 501, although embodiments are not limited thereto. Various parameters that may be associated with each node object. For example, name 502 may specify the name of the node object, and scene name 504 may specify the name of the single scene.

The glTF scene assets may be consumed by a presentation engine for rendering a 3D or immersive scene to users. The existing glTF syntax only supports 3D objects including static or computer-generated animations. There is no support for media types such as video or audio, let alone rendering those video/audio media types.

Meanwhile, existing glTF can not describe a scene using geographical coordinate systems, which in some media presentation scenarios, such a feature is desired.

Therefore, there is a need to extend the glTF to support media types includes traditional 2D flat video, immersive media content such as virtual reality (VR), augmented reality (AR), extended reality (XR), and spatial audios. This may require an extension to support video/audio syntax and a system for media deliveries and render Moving Picture Experts Group (MPEG) defines some extensions on top of the glTF specification to support immersive media content. Referring to FIG. 3, new extensions are MPEG_media 330, MPEG_scene_dynamic 331, MPEG_texture_video 333, MEPG_animation_timing 332, MPEG_audio_spatial 334, MPEG_accessor_timed 335, MPEG_buffer_circular 336. In FIG. 3 generally, elements with rounded outlines, for example elements 301-317, may be glTF elements, and elements with square outlines, for example elements 330-336, may correspond to MPEG-based extensions of the glTF specification, although embodiments are not limited thereto.

If MPEG_media 330 as a root identifier, if specified, then MPEG_media may be supported. Referring to FIG. 6, the syntax to support MPEG media may be declared as the top-level JSON syntax. Syntax from 601 to 604 may be presented exactly as shown if supported.

Scene Updates may be expressed using the JSON Patch protocol and MPEG_scene_dynamic 331 may be used to support JSON patch protocol.

MPEG texture video extension, identified by MPEG_texture_video 333, may provide the possibility to link a glTF texture object to MPEG media and its respective track, listed by an MPEG_media object. MPEG texture video extension may also provide a reference to the MPEG_accessor_timed 335, where the decoded timed texture will be made available.

The MPEG_audio_spatial 334 extension may support multiple audio types.

In order to support timed data access, the buffer element may be extended to provide circular buffer functionality. The extension is named MPEG_buffer_circular 336 and may be included as part of the glTF "buffers" objects, for example buffer 313.

Above MEPG extensions may allow for the creation of immersive experiences using glTF. Eventually the glTF assets with MPEG extension may be used to be load into a rendering engine for visualization.

Figure 4:
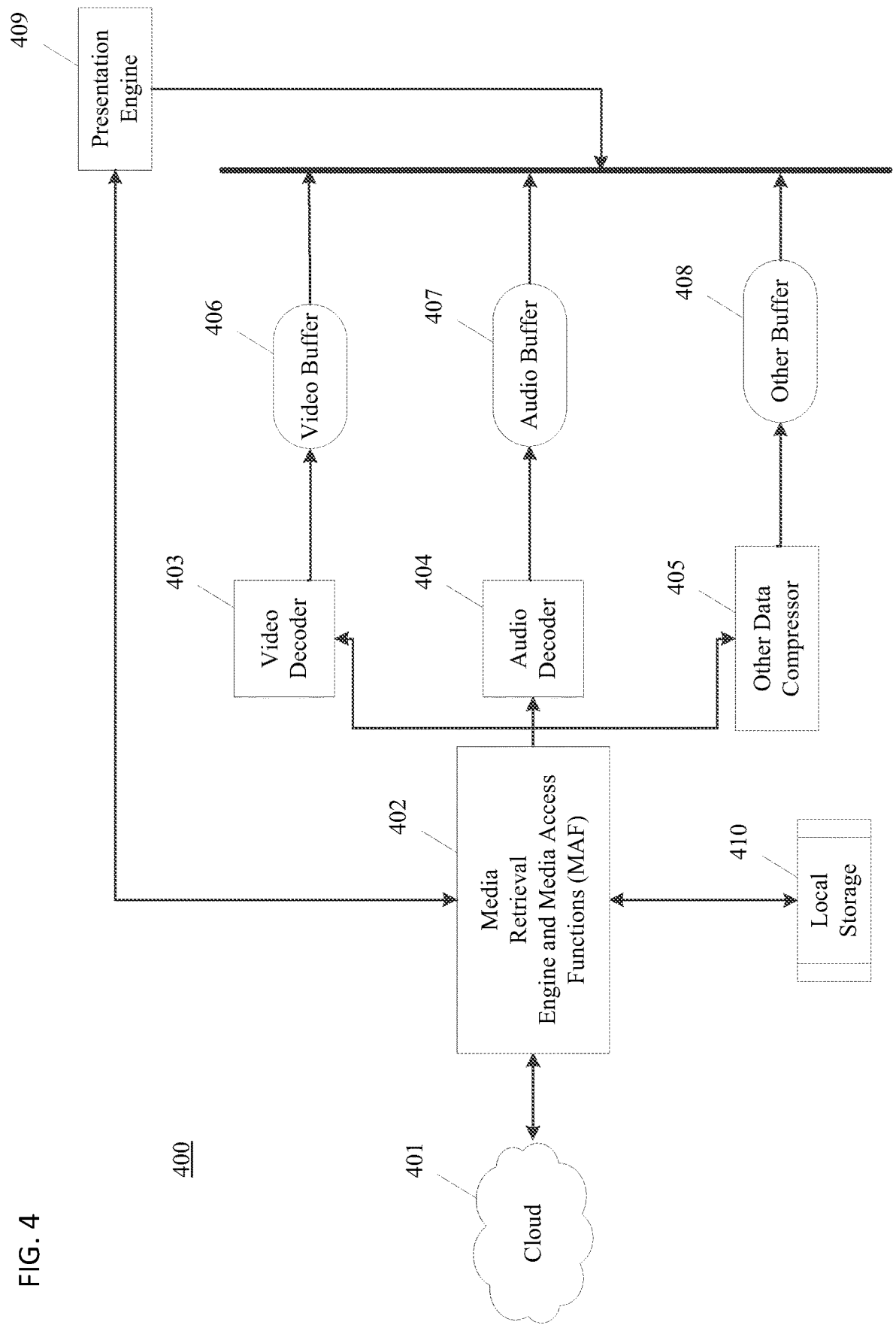
FIG. 4 is a schematic illustration of the media scene description system reference architecture, according to embodiments.

Referring to FIG. 4, a reference media scene description architecture 400 illustrates an example of how MPEG extensions may be used to support media type such as audio/ video. The media contents may be retrieved using a Media Retrieval Engine and Media Access Functions (MAF) 402 from external sources such as a media cloud 401, processed using video decoder 403, audio decoder 404, and other data compressor 405, buffered in video buffer 406, audio buffer 407, and other buffer 408, and rendered by a presentation engine 409. In some cases, media content may be stored in local storage 410.

Referring to FIG. 4, the MPEG scene description extensions may decouple the Presentation Engine 409 from the Media Retrieval Engine 402. Presentation Engine 409 and Media Retrieval Engine 402 may communicate through the predefined programming interfaces, which allows the Presentation Engine 409 to request media data required for the rendering of the scene. The Media Retrieval Engine 402 may retrieve the requested media and make it available in a timely manner and in a format that can be immediately processed by the Presentation Engine 409. For instance, a requested media asset may be compressed and residing in the network, so the Media Retrieval Engine 402 will retrieve and decode the asset and pass the resulting media data to the Presentation Engine 409 for rendering. The media data may be passed in form of buffers from the Media Retrieval Engine 402 to the Presentation Engine 409. The requests for media data may be passed through a Media Retrieval API from the Presentation Engine 409 to the Media Retrieval Engine 402. For flexible use of video decoding resource, the Video Decoder 403 may be used. When the Video Decoder 403 is used, the Presentation Engine 409 may provide information for input formatting and output formatting to the Video Decoder 403 through Application Configuration APIs.

Dynamic Adaptive Streaming over HTTP (DASH) or MPEG-DASH, is an adaptive bitrate streaming technique that enables high quality using HTTP as transport level protocol. The DASH content may be divided into multiple segments and each segment may contain a short interval of playback time of content. The content may be made available at a variety of different bit rates, i.e., alternative segments encoded at different bit rates covering aligned short intervals of playback time. While the content is being played back by an MPEG-DASH client, the client may use a customized bit rate adaptation algorithm to automatically select the segment with the highest bit rate possible based on network condition which resulting in a smooth playback without causing stalls or re-buffering events in the playback A scene description may support MPEG-DASH for playback. Currently, MPEG supports DASH media playback as a timed media identified as MPEG timed media extension.

Referring to FIG. 6B, a DASH-based timed media may be identified by the mimeType (613) with a LANA value "application/dash+xml". Each DASH may have one manifest file called a Media Presentation Description (MPD) file to illustrate how media segments are divided and configured. Such MPD file may be identified by a url or uri (614). The media track information may be identified by a track, and each DASH timed media may have one or more track information, such as shown in (615). A DASH client may use different track # based on the network condition. Also there may be more than one DASH MPD file in one timed media extension such as shown in extension (616) which may have one or more tracks for that specific MPD file.

In an immersive scene environment, a point of view of a user or camera is not always fixed on a particular object. With the current support of timed media in scene description, there is a desire for an optimal view experience when there is one or more timed media in a scene. Accordingly, embodiments may relate to an extension to enable DASH dynamic bitrate switching along with viewport update. In the glTF concept, this enables DASH-based MPEG timed media to automatically switch bitrate when the camera moving the focus on and off a timed media object. This may a user's quality of experience, increase network bandwidth efficiency.

As discussed above, DASH as an adaptive HTTP-based media streaming method enables a client to automatically adjust bitstream bitrate with predefined small bitstream segments based on network condition or buffer status. The advantage of switching up/down the bitrate quality can reduce re-buffer frequency resulting in a smooth playback experience.

As shown in FIG. 6A, an MPEG media extension, identified as MPEG_media (601), may enable scene description for playback DASH-based timed media. While the current design of DASH adaptive streaming is implementation-specific, the usage of DASH native switching does not provide optimal networking bandwidth usage in an immersive or 360-degree scene environments. For example, a view of a media play may not be always in the range of the current viewport, which may cause the unnecessary network resource waste. In embodiments, a current viewport may be a portion of an immersive, 3D, VR/AR/XR, or 360-degree scene that is currently being viewed by a camera or a user, or reproduced for a user. To provide a smooth timed media playback experience, it may be important to manage how network bandwidth is consumed.

Accordingly, embodiments may enable DASH-based timed media bitrate adaptation along with viewport update. In the glTF concept, this may enable DASH-based media playback to automatically switch bitrate when the camera on and off focus on a timed media object. In turn, this improves a user's quality of experience, and increase network bandwidth efficiency.

Figure 7:
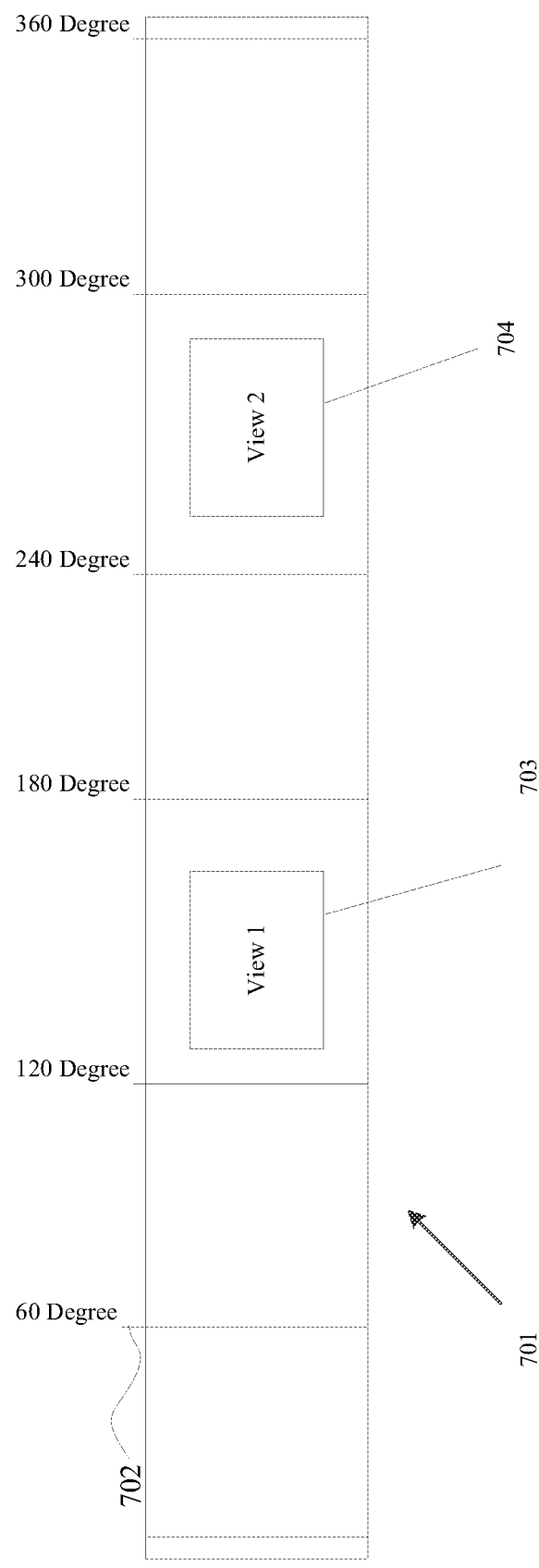
FIG. 7 is a schematic illustration of two or more-timed media playback in an immersive scene scenario, according to embodiments.

Referring to FIG. 7, an immersive scene (701) with one or potentially more media playback is shown. Playback view 1 (703) and view 2 (702) may be rendered by presentation engine 409 and being allocated with positions shown in FIG. 7.

It is reasonable to assume that not all of the 360 view are in the range of the user's viewport or a camera's coverage area. That being said, not all view 1 and view 2 are currently being watched at the same time.

To explain further the use cases, the following scene objects are used for explanation of potential use cases. Refer back to FIG. 7, assuming video-1 is playing under view 1 (703) and video-2 is playing in view 2 (704). Table 1 provides information about the scene shown in FIG. 7.

TABLE 1

| Asset | Description |
| --- | --- |
| A scene | A glTF asset that represents a living room. |
| Video-1 | DASH-based video files |
| Video-2 | DASH-based video files |

In a simple example use case, there is only one DASH-based timed media played in a scene as shown in FIG. 3. The media may be rendered based on the MPEG_media extension with configurable parameters such as autoplay (621), loop (622), etc. DASH adaptative streaming in this case may be used within its native mechanism by switching bitrate based on either network condition or buffer status. The key observation in this case is that the video keeps playing even when the viewport is not in focus. In an adequate network environment, DASH switches to the highest bitrate possible without considering the overall bandwidth consumption for a scene as a whole. In a less desirable network condition, with a camera's focus is on a set of relatively large bandwidth consumption scene objects such as point cloud compressed (PCC) objects, unnecessary bandwidth consumption from the ongoing timed media playback may not be an optimal solution for view quality of the current viewport.

When more than one timed media is played at the same time, as shown in FIG. 7, network bandwidth usage is similar to the use case like above. However, the situation may get worse when all of the timed media are in a high-resolution setup. The lack of balancing network resources for each of the media play may worsen the view quality.

Therefore, providing a client with options for configurable bandwidth usage for each of the DASH-based timed media may become an important feature for scene description.

Accordingly, embodiments enable DASH-based MPEG timed media to automatically switch bitrate based on the camera's focus point. The implementation of how the bitrate level is adjusted can be case-by-case. This provides the opportunity for a client to turn on/off the viewpoint adaptation in certain view configurations to save network bandwidth in a relatively complex scene rendering scenarios.

Referring to FIG. 8, an MPEG DASH viewport adaptation extension according to embodiments may be identified by MPEG_dash_viewport_adaptation (802 and 804). It may be included in the extensionsUsed (803) and extensionsRequired (801) of the scene description document for scene descriptions that require the use of DASH viewport adaptation. In embodiments, viewport adaptation may refer to the use of adaptive streaming techniques, for example DASH-based timed media bitrate adaptation or any other adaptive streaming techniques, based on or in consideration of a viewport or viewpoint of a user.

When the MPEG_dash_viewport_adaptation extension is not supported, a camera object may remain the same parameter set as specified in the glTF. Table 2 list an example of the definition of top-level objects of MPEG_dash_viewport_adaptation extension.

TABLE 2

| Name | Type | Description |
| --- | --- | --- |
| adaptive | Boolean | Specifies to turn on/off DASH adaptive viewpoint adaptation. Default is false. |

FIG. 9, shows an example of one camera object with proposed MPEG_dash_viewport_adaptation extension. The original MPEG_extension with mimeType specifying "application/dash+xml" remains unchanged.

When MPEG_dash_viewport_adaptation is in use according to embodiments discussed above, by switching on and off the "adaptative" parameter specified in Table 2, a client can enable the viewport adaptation with "adaptative"=True. The logic of bitrate level or DASH track switching may be implementation specific.

Accordingly, embodiments may relate to a new scene description extension to enable DASH-based timed media bitrate adaptation along with viewport update, and to a set of parameters as identification of enabling a proposed extension.

Figure 10A:
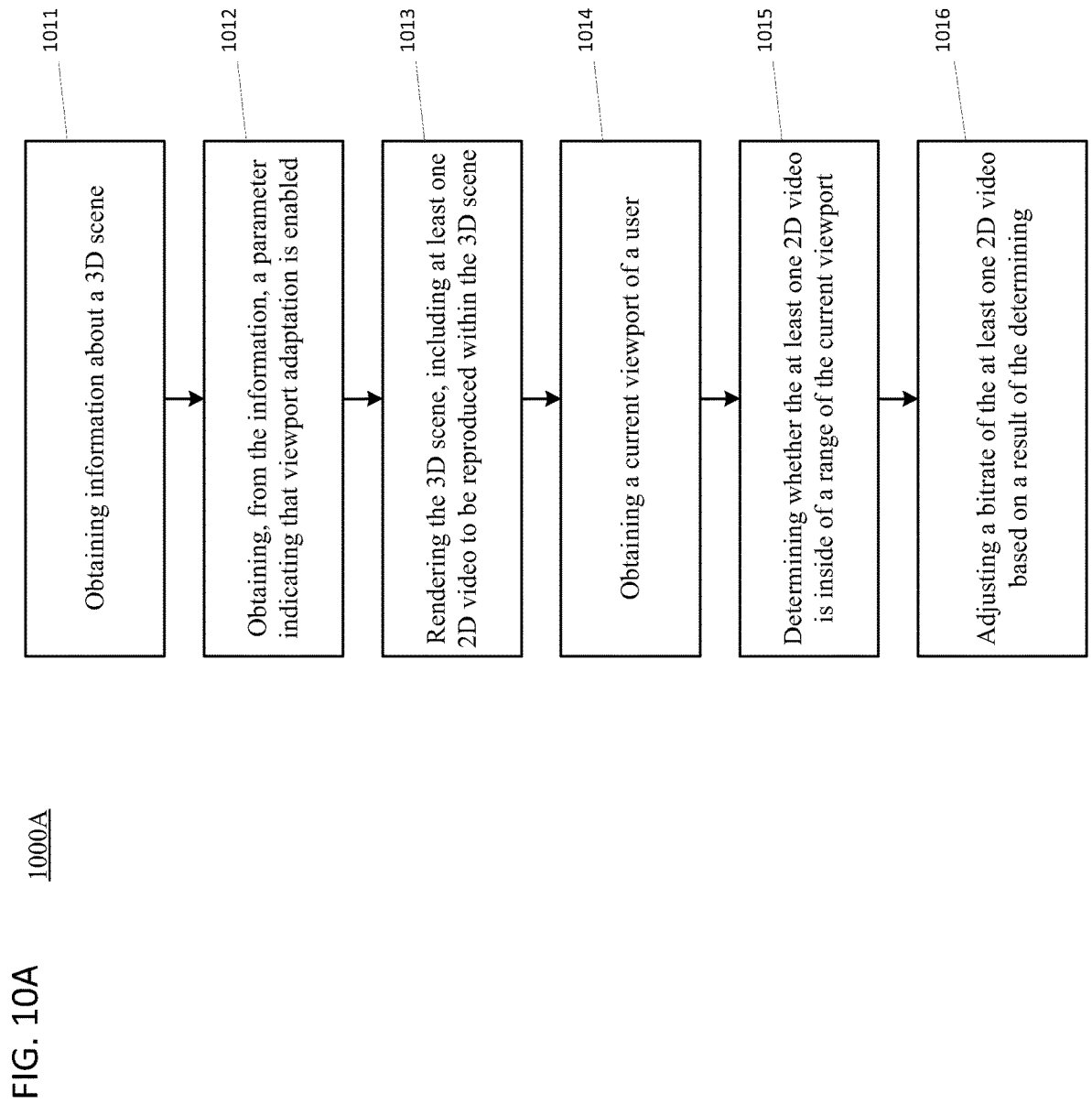
FIGS. 10A-10B are diagrams of example processes for managing media storage and delivery according to embodiments.
Figure 10B:
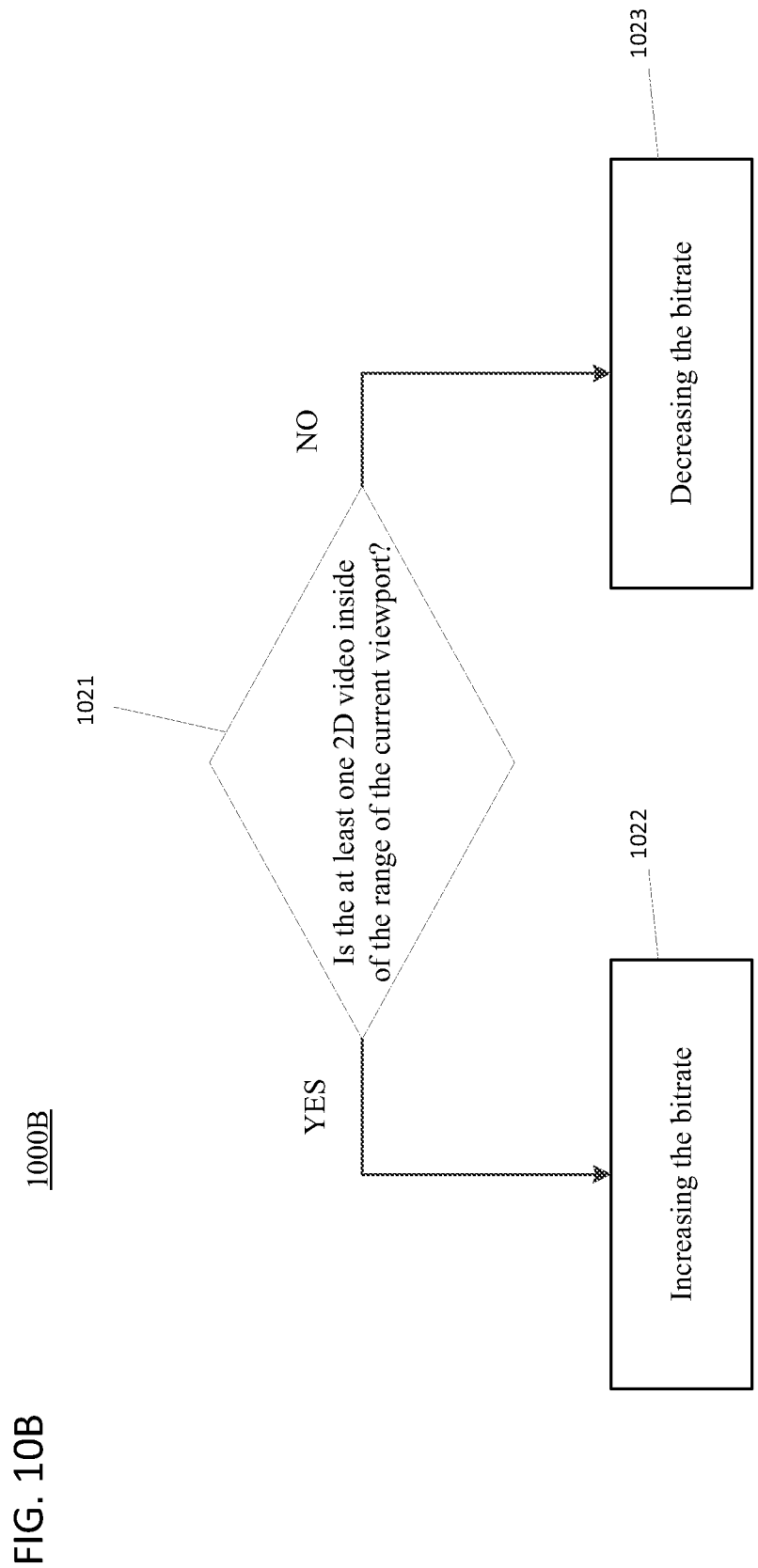

Referring to FIGS. 10A-10B a processes 1000A and 1000B for managing media storage and delivery are described below.

FIG. 10A is a flowchart of an example process 1000A for managing media storage and delivery.

As shown in FIG. 10A, process 1000A may include obtaining information about a three-dimensional (3D) scene (block 1011). In embodiments, the information may correspond to a glTF scene or a glTF asset.

As further shown in FIG. 10A, process 1000A may include obtaining, from the information, a parameter indicating that viewport adaptation is enabled (block 1012). In embodiments, the parameter may correspond to the "adaptive" parameter of the DASH viewport adaptation extension discussed above.

As further shown in FIG. 10A, process 1000A may include rendering the 3D scene, wherein the 3D scene includes at least one two-dimensional (2D) video to be reproduced within the 3D scene (block 1013).

As further shown in FIG. 10A, process 1000A may include obtaining a current viewport of a user (block 1014).

As further shown in FIG. 10A, process 1000A may include determining whether the at least one 2D video is inside of a range of the current viewport (block 1015).

As further shown in FIG. 10A, process 1000A may include adjusting a bitrate of the at least one 2D video based on a result of the determining (block 1016).

FIG. 10B is a flowchart of an example process 1000B for managing media storage and delivery. In embodiments, one or more blocks of process 1000B may correspond to one or more blocks of process 1000A. For example, in embodiments block 1021 of process 1000B, may correspond to block 1014 of process 1000A, and one or both of blocks 1022 and 1023 of process 1000 may correspond to block 1016 of process 1000A.

As shown in FIG. 10B, process 1000B may include determining whether the at least one 2D video is inside of the range of the current viewport (block 1021).

As further shown in FIG. 10B, process 1000B may include, based on determining that the at least one 2D video is inside of the range of the current viewport (YES at block 1021), increasing the bitrate (block 1022).

As further shown in FIG. 10B, process 1000B may include based on determining that the at least one 2D video is outside of the range of the current viewport (NO at block 1021), decreasing the bitrate (block 1023).

In embodiments, the at least one 2D video may include a first 2D video having a first bitrate and a second 2D video having a second bitrate, and the adjusting may include, based on determining that the first 2D video is inside of the range of the current viewport and that the second 2D video is outside of the range of the current viewport, adjusting the second bitrate to be lower than the first bitrate.

In embodiments, the information may include a graphics language transmission format (glTF) asset.

In embodiments, the glTF asset may include a JavaScript Object Notation (JSON) object.

In embodiments, the parameter may be included in a camera node of the glTF asset.

In embodiments, the parameter may be included in a Moving Picture Experts Group (MPEG) media extension specified by the glTF asset.

In embodiments, the parameter may relate to streaming of the at least one 2D video using MPEG-Dynamic Adaptive Streaming over Hypertext Transfer Protocol (MPEG-DASH).

Although FIGS. 10A-10B show example blocks of processes 1000A and 1000B, in some implementations, processes 1000A and 1000B may include additional blocks, fewer blocks, different blocks, or differently arranged blocks than those depicted in FIGS. 10A-10B. Additionally, or alternatively, two or more of the blocks of processes 1000A and 1000B may be performed in parallel. In embodiments, any one or more blocks of process 1000A may be combined with any one or more blocks of process 1000B in any order, and any one or more of any blocks of processes 1000A and 1000B may be split or combined as desired.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of managing media storage and delivery, comprising:
    obtaining information about a three-dimensional (3D) scene;
    obtaining, from the information, a parameter indicating that viewport adaptation is enabled,
        wherein the parameter indicating that viewpoint adaptation is enabled indicates that a media bitrate of a timed media presentation is adjusted based on a range of a current viewport;
    rendering the 3D scene, wherein the 3D scene includes at least one timed media to be reproduced within the 3D scene;
    obtaining the current viewport of a user;
    determining whether the at least one timed media is inside or outside of the range of the current viewport; and
    reducing a bitrate of a first timed media among the at least one timed media based on a result of determining that the first timed media is outside the range of the current viewport.

2. The method of claim 1, wherein the method further comprises:
    based on determining that the first timed media is inside of the range of the current viewport, increasing the bitrate of the first timed media.

3. The method of claim 1, wherein the at least one timed media comprises the first timed media having a first bitrate and a second timed media having a second bitrate, and wherein the method comprises, based on determining that the first timed media is inside of the range of the current viewport and that the second timed media is outside of the range of the current viewport, adjusting the second bitrate to be lower than the first bitrate.

4. The method of claim 1, wherein the information comprises a graphics language transmission format (glTF) asset.

5. The method of claim 4, wherein the glTF asset comprises a JavaScript Object Notation (JSON) object.

6. The method of claim 4, wherein the parameter is included in a camera node of the glTF asset.

7. The method of claim 4, wherein the parameter is included in a Moving Picture Experts Group (MPEG) media extension specified by the glTF asset.

8. The method of claim 7, wherein the parameter relates to streaming of the at least one timed media using MPEG-Dynamic Adaptive Streaming over Hypertext Transfer Protocol (MPEG-DASH).

9. A device for managing media storage and delivery, the device comprising:
at least one memory configured to store program code; and
at least one processor configured to read the program code and operate as instructed by the program code, the program code including:
first obtaining code configured to cause the at least one processor to obtain information about a three-dimensional (3D) scene;
second obtaining code configured to cause the at least one processor to obtain, from the information, a parameter indicating that viewport adaptation is enabled,
wherein the parameter indicating that viewpoint adaptation is enabled indicates that a media bitrate of a timed media presentation is adjusted based on a range of a current viewport;
rendering code configured to cause the at least one processor to render the 3D scene, wherein the 3D scene includes at least one timed media to be reproduced within the 3D scene;
third obtaining code configured to cause the at least one processor to obtain the current viewport of a user;
second determining code configured to cause the at least one processor to determine whether the at least one timed media is inside or outside of the range of the current viewport; and
adjusting code configured to cause the at least one processor to reduce a bitrate of a first timed media among the at least one timed media based on a result of determining that the first timed media is outside the range of the current viewport.

10. The device of claim 9, wherein the adjusting code comprises:
increasing code configured to cause the at least one processor to increase the bitrate of the first timed media based on determining that the first timed media is inside of the range of the current viewport.

11. The device of claim 9, wherein the at least one timed media comprises the first timed media having a first bitrate and a second timed media having a second bitrate, and wherein the adjusting code comprises, based on determining that the first timed media is inside of the range of the current viewport and that the second timed media is outside of the range of the current viewport, adjusting the second bitrate to be lower than the first bitrate.

12. The device of claim 9, wherein the information comprises a graphics language transmission format (glTF) asset.

13. The device of claim 12, wherein the glTF asset comprises a JavaScript Object Notation (JSON) object.

14. The device of claim 12, wherein the parameter is included in a camera node of the glTF asset.

15. The device of claim 12, wherein the parameter is included in a Moving Picture Experts Group (MPEG) media extension specified by the glTF asset.

16. The device of claim 15, wherein the parameter relates to streaming of the at least one timed media using MPEG-Dynamic Adaptive Streaming over Hypertext Transfer Protocol (MPEG-DASH).

17. A non-transitory computer-readable medium storing instructions, the instructions comprising: one or more instructions that, when executed by at least one processor of a device for managing media storage and delivery, cause the at least one processor to:
obtain information about a three-dimensional (3D) scene;
obtain, from the information, a parameter indicating that viewport adaptation is enabled,
wherein the parameter indicating that viewpoint adaptation is enabled indicates that a media bitrate of a timed media presentation is adjusted based on a range of a current viewport;
render the 3D scene, wherein the 3D scene includes at least one timed media to be reproduced within the 3D scene;
obtain the current viewport of a user;
determine whether the at least one timed media is inside or outside of the range of the current viewport; and
reduce a bitrate of a first timed media among the at least one timed media based on a result of determining that the first timed media is outside the range of the current viewport.

18. The non-transitory computer-readable medium of claim 17, wherein the reducing further comprises:
increasing the bitrate of the first timed media based on determining that first timed media is outside of the range of the current viewport.

19. The non-transitory computer-readable medium of claim 17, wherein the at least one timed media comprises the first timed media having a first bitrate and a second timed media having a second bitrate, and wherein the reducing comprises, based on determining that the first timed media is inside of the range of the current viewport and that the second timed media is outside of the range of the current viewport, adjusting the second bitrate to be lower than the first bitrate.

20. The non-transitory computer-readable medium of claim 17, wherein the information comprises a graphics language transmission format (glTF) asset.

* * * * *